May 9, 1939.  F. C. STANCIL  2,157,273
TRACTOR CULTIVATOR
Filed July 3, 1936  4 Sheets-Sheet 1
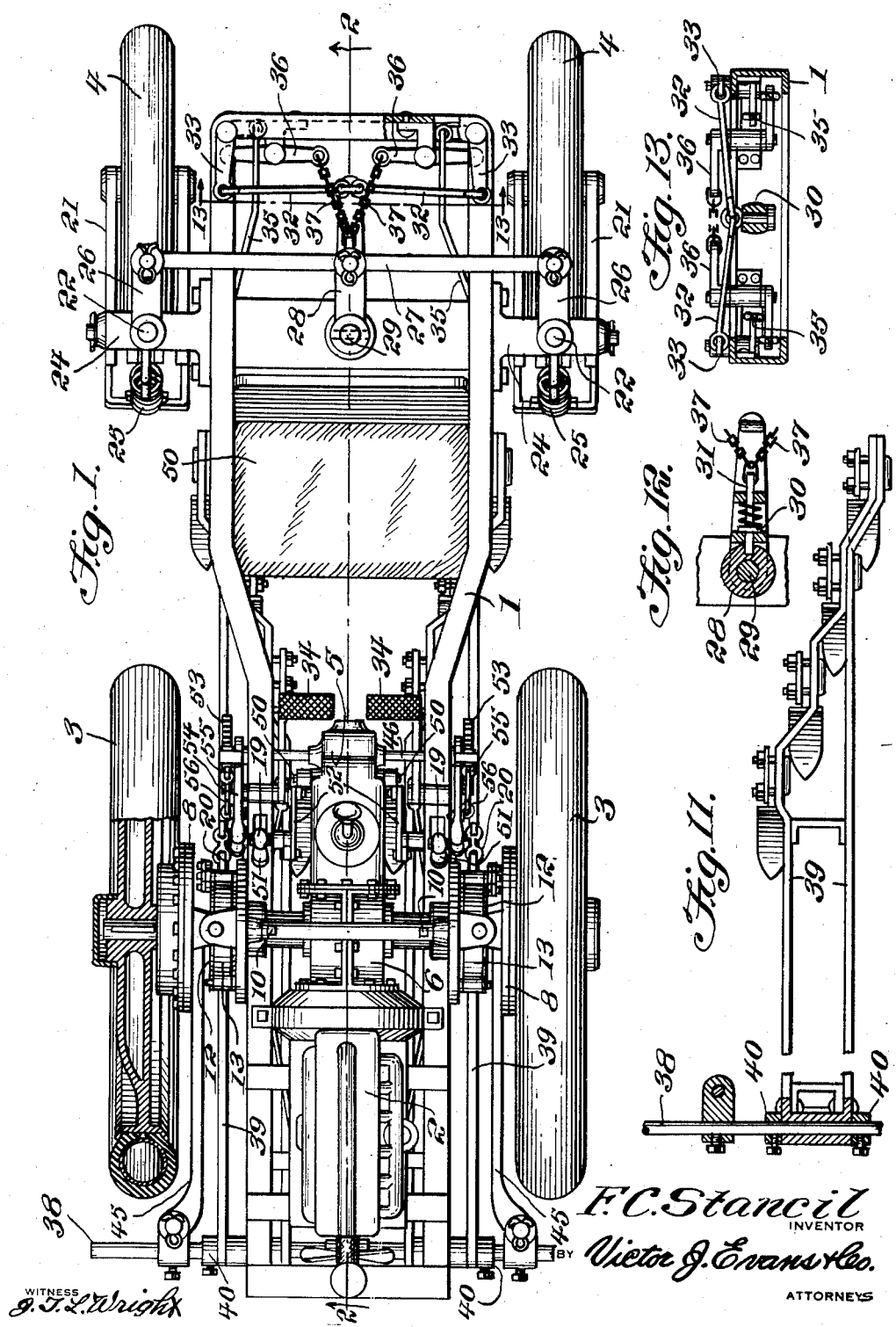
F. C. Stancil
INVENTOR
BY Victor J. Evans & Co.
ATTORNEYS May 9, 1939.          F. C. STANCIL                 2,157,273
                    TRACTOR CULTIVATOR
                    Filed July 3, 1936            4 Sheets-Sheet 2
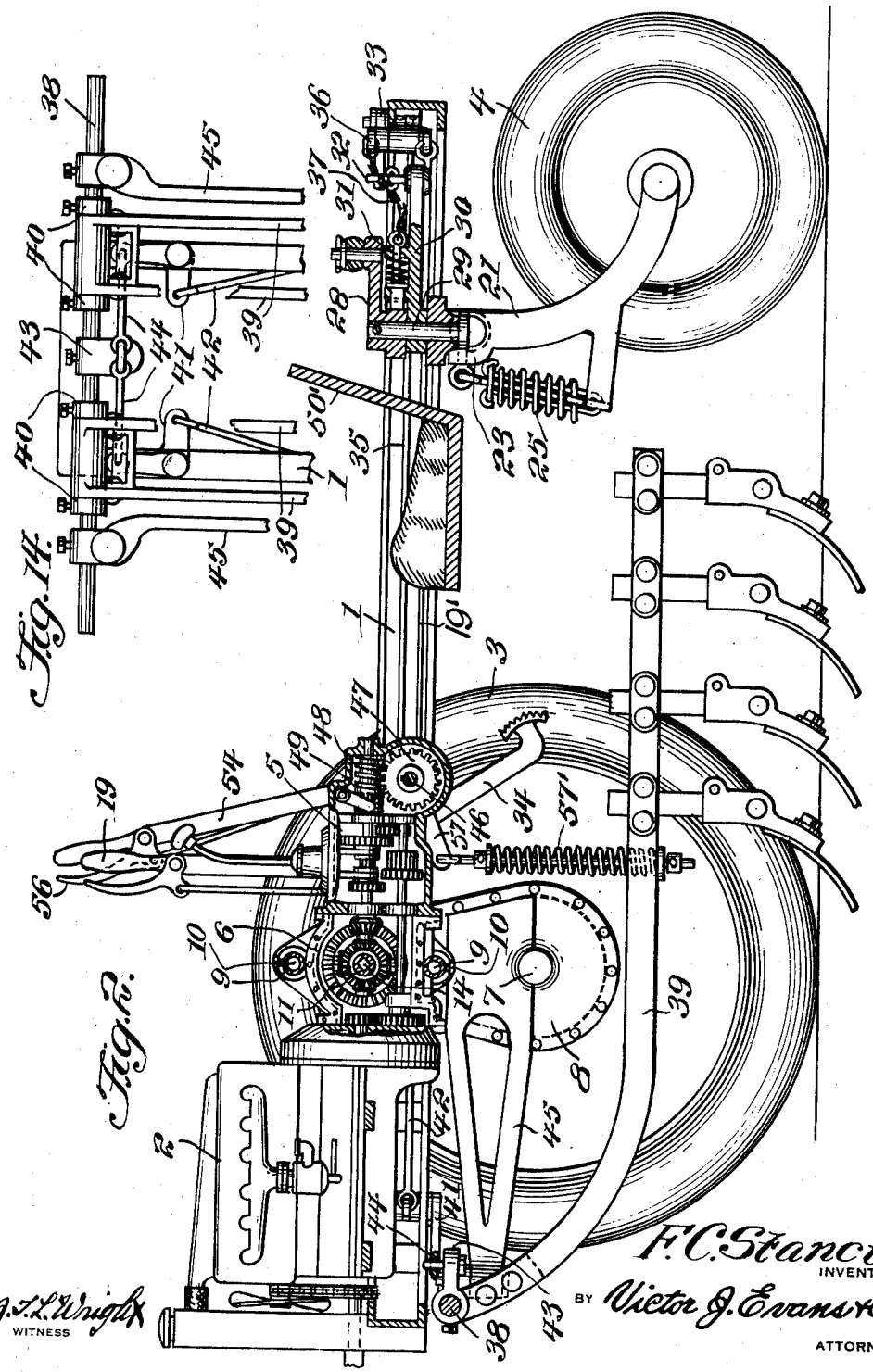

May 9, 1939.  F. C. STANCIL  2,157,273
TRACTOR CULTIVATOR
Filed July 3, 1936  4 Sheets-Sheet 3
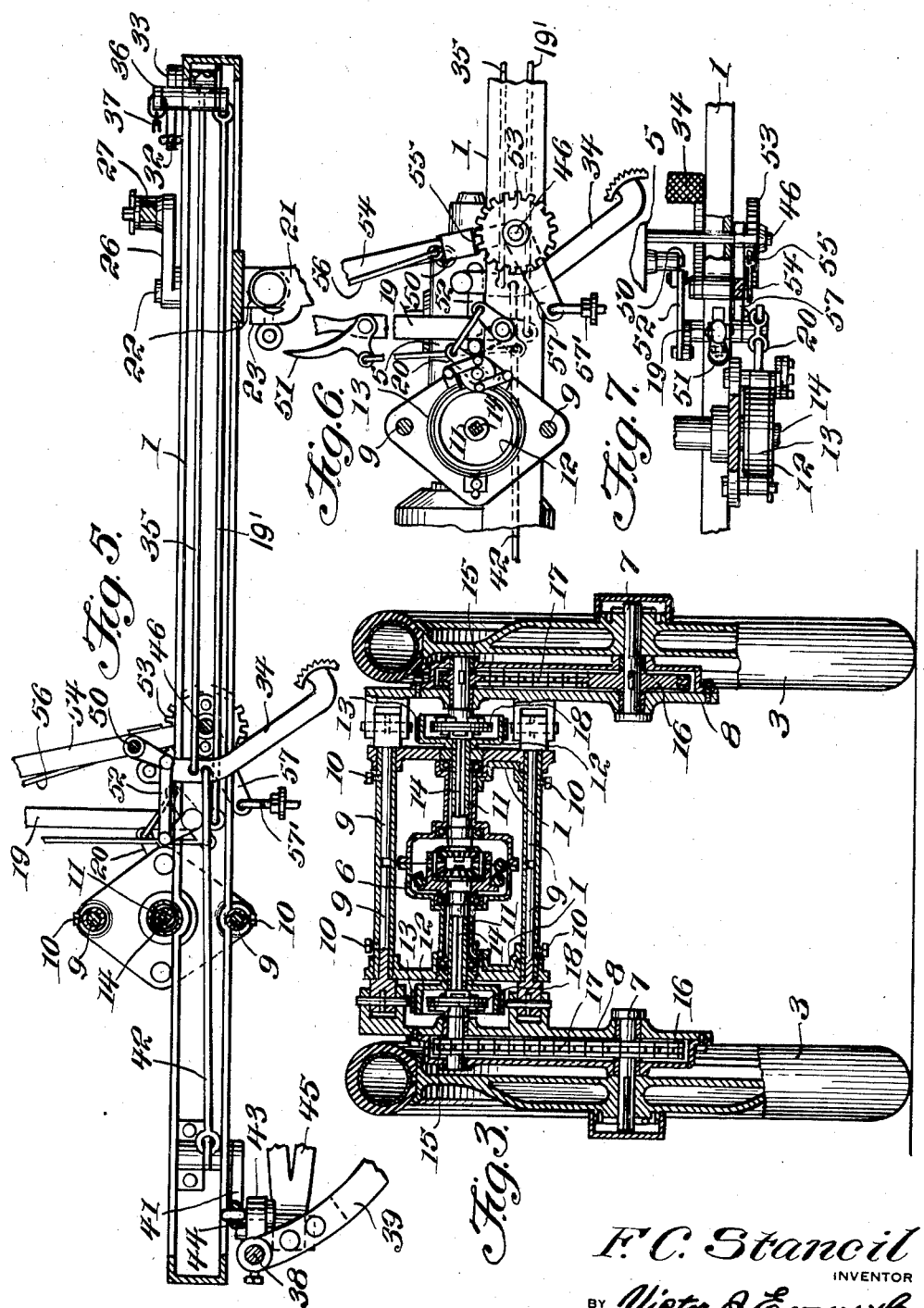
F. C. Stancil
INVENTOR
BY Victor J. Evans & Co.
ATTORNEYS
WITNESS J. T. L. Wright May 9, 1939.  F. C. STANCIL  2,157,273
TRACTOR CULTIVATOR
Filed July 3, 1936  4 Sheets-Sheet 4
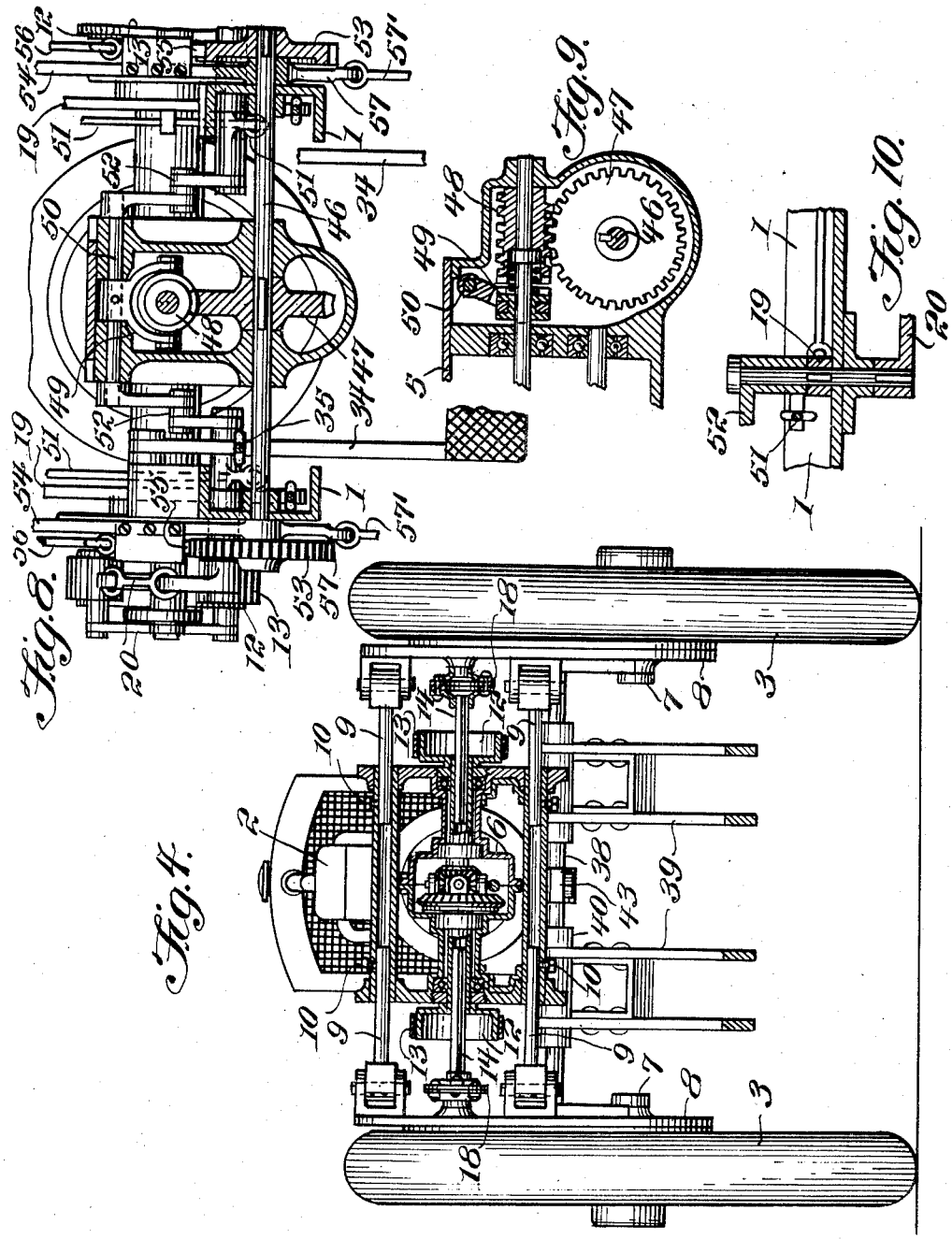
F. C. Stancil
INVENTOR
BY Victor J. Evans & Co.
ATTORNEYS
WITNESS J. T. L. Wright Patented May 9, 1939

2,157,273

UNITED STATES PATENT OFFICE 2,157,273

TRACTOR CULTIVATOR

Fred C. Stancil, Altoona, Ala., assignor to Alabama Tractor and Plow Company, Walnut Grove, Ala., a corporation of Alabama Application July 3, 1936, Serial No. 88,875

1 Claim. (Cl. 280—87.1)

This invention relates to tractor cultivators and more particularly to a tractor construction.

The primary object of the invention is the provision of a simple, practical and easily operated steering mechanism for effecting simultaneous steering of all wheels of the tractor or may be operated to release the non-traction wheels so that they may freely follow or trail the traction wheels of said tractor and to retard either traction wheel while power is delivered to the other traction wheel for bringing about turning of the tractor in very limited spaces. The simultaneous steering of all wheels of said tractor permits rows of vegetation to be readily followed by the tractor and also to bring about lateral shifting of the plow or cultivating mechanism in the direction of the turn being made by the tractor for maintaining the plowing or cultivating mechanism in proper relation to the rows of vegetation.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view, partly in section, illustrating the tractor cultivator constructed in accordance with my invention.

Figure 2 is a sectional view taken on the line 2—2 of Figure 1.

Figure 3 is a transverse sectional view illustrating means of delivering power to the traction wheels of the tractor.

Figure 4 is a transverse sectional view illustrating means for braking or retarding the rotation of either of the traction wheels while the other receives power.

Figure 5 is a fragmentary longitudinal sectional view illustrating brake operated means, steering means and manual means for raising and lowering the cultivating or plowing mechanism.

Figure 6 is a fragmentary sectional view drawn on an enlarged scale showing the controls for the means disclosed by Figure 5.

Figure 7 is a fragmentary plan view, partly in section, of the controls.

Figure 8 is a transverse sectional view showing power takeoff means for raising or elevating the cultivating or plowing mechanism.

Figure 9 is a fragmentary vertical sectional view illustrating the same.

Figure 10 is a detail view illustrating the mounting of the control for manually elevating or lowering the plow or cultivating mechanism.

Figure 11 is a fragmentary plan view, partly in section, showing one of the cultivating or plowing units.

Figure 12 is a detail sectional view illustrating a latching means employed in connection with the steering means of the non-traction wheels of the tractor.

Figure 13 is a transverse sectional view taken on the line 13—13 of Figure 1.

Figure 14 is a fragmentary end view showing some of the control means for steering the traction wheels.

Referring in detail to the drawings, the numeral 1 indicates a main frame carrying at its front end an engine 2. The frame is supported by traction wheels 3 and non-traction wheels 4. The wheels 3 are located in advance of the wheels 4. Supported by the frame 1 is a suitable transmission 5 and located between the transmission and the engine is a differential 6. A driving connection is provided between the transmission 5 and the usual clutch of the engine, also a drive is provided between the transmission and the differential. The transmission provides variable speeds for the tractor and the differential delivers power from the transmission to the traction wheels 3 so that either of said wheels may rotate faster than the other.

The wheels 3 are secured to axles 7 and the latter are journaled in vertically arranged housings 8 located at opposite sides of the main frame 1. The housings 8 are pivoted to supporting shafts 9 arranged horizontally and adjustably connected with the main frame whereby the wheels 3 may be steered in either direction and the distances between said wheels 3 varied to meet with farming conditions. The shafts 9 are held in adjusted positions by set bolts 10.

The differential 6 is of a conventional construction and is suitably supported to the main frame 1. The shafts of the differential are indicated by the numeral 11 and are of hollow formation and carry at their outer ends brake drums 12 and operating in conjunction with the brake drums are brake bands 13. Splined in the shafts 11 are power shafts 14 and the latter are journaled in the housings 8 and have secured thereto sprocket gears 15. Sprocket gears 16 are secured to the axles 7 of the wheels 3. The sprocket gears 15 and 16 are connected by sprocket chains 17. The power shafts 14 are sectional and the sections thereof are connected by universal joints 18. The universal joints permit steering of the traction wheels 3 in either direction while power is still delivered to said wheels.

Brake levers 19 are pivoted on the main frame and are operatively connected to the brake bands 13 by linkage 20 whereby the brake bands may be actuated independently of each other permitting the braking force to be applied to either or both of the traction wheels. This arrangement permits comparatively short turning of the tractor by power derived from the engine, being accomplished by applying braking action to one of the wheels 3 while the other wheel is permitted to rotate freely by the power derived from the engine.

The non-traction wheels 4 are journaled to forked axles 21 and the latter are hinged to shafts 22. The hinges connecting the axles to the shafts 22 are equipped with stops 23 for limiting the hinging movement of the axles 21 in one direction. The shafts 22 are vertically arranged and journaled in brackets 24 secured to opposite sides of the main frame 1. Spring devices 25 are connected to the brackets 24 and to the axles 21. The spring devices and the hinges permit the wheels 4 to kick back when engaged by obstructions, the spring devices returning the axles 21 to normal position after the passing of the obstructions by the wheels. The shafts 22 have arms 26 secured thereto and said arms are connected together by a connecting bar 27 whereby the steering of the wheels 4 will be in unison and in the same direction. The connecting bar 27 is pivoted to the arms and has pivoted thereto an arm 28. The arm 28 is secured to a pin 29, the latter being journaled to the main frame 1. The pin 29 has journaled thereon a steering arm 30 releasably secured to the arm 28 by a spring actuated latch 31. Oppositely extending links 32 are pivoted to the steering arm 30 and to bell crank levers 33 pivotally mounted on the main frame. The bell crank levers are connected to foot pedals 34 pivotally mounted on the main frame by rods 35. The foot pedals are located adjacent the control levers 19 of the brakes. The foot pedals 34 are employed for steering the wheels 4, one of the foot pedals being actuated when desiring to steer to the right and the other foot pedal actuated when desiring to steer to the left.

Levers 36 are pivoted to the main frame 1 and are connected to the latch 31 by flexible elements 37. The levers 36 are also connected to the brake control levers 19 by rods 19'. When either of the brake control levers 19 is moved to apply the brakes to either of the traction wheels 3, the latch 31 will be actuated to free the steering arm 30 from the arm 28. The freeing of the steering arm 30 from the arm 28 will permit the wheels 4 to become free of the steering mechanism of the tractor so that when steering said tractor through the traction wheels 3 by power received from the engine, the wheels 4 will readily trail or track the traction wheels, consequently permitting the tractor to be turned in spaces of very limited size. When the brake control levers 19 are returned to non-brake applying position, the latch 31 reestablishes connection between the steering arm 30 and the arm 28 thereby restoring the wheels 4 to steering action by the pedals 34.

A bar 38 is located at the forward end of the main frame 1 and transversely of the latter. Plow or cultivating gangs 39 are journaled on the bar 38 and are adapted to operate on the soil under the main frame 1. The gangs are capable of being adjusted endwise of the bar 38 and are held in adjusted positions by means of stop collars 40 secured to the bar 38 by set screws.

Bell crank levers 41 are pivoted to the forward end of the main frame and are connected to the foot pedals 34 by rods 42. An arm 43 is secured to the bar 38 and is connected to the bell crank levers 41 by links 44. Arms 45 are secured to the housings 8 of the wheels 3 and are pivotally connected to the bar 38. Also, the arms 45 may be adjusted endwise of the bar 38.

The right and left foot pedals 34 are employed by the operator when steering the tractor along the rows being plowed or cultivated. When the right hand pedal 34 is pressed forward, it acts through the rod 42 to pivot its respective bell crank lever 41 in a clockwise direction. The lever 41 thus acts through the links 44, arm 43, bar 38, and arms 45 to pivot the wheels 3 to the right. While the wheels 3 are thus being turned to the right by the right hand foot pedal 34, this pedal also acts through the rod 35 to pivot its respective bell crank lever 33 in a clockwise direction. The lever 33 then acts through its connecting link 32, steering arm 30, and latch 31 to pivot the arm 28 in an anti-clockwise direction about the post 29. The arm 28 then acts through the connecting bar 27 to pivot the arms 26 in an anti-clockwise direction to turn the wheels 4 to the left. It will thus be seen that the right hand foot pedal 34 acts to turn the front wheels 3 to the right and at the same time turn the rear wheels 4 to the left.

The left hand pedal 34 acts through the push rod 42 to pivot the bell crank lever 41 associated therewith in an anti-clockwise direction. The lever 41 then acts through the links 44, arm 43, bar 38, and arms 45 to pivot the wheels 3 to the left. The pedal 34 on the left of the driver also acts through its rod 35 to pivot its respective bell crank lever 33 in an anti-clockwise direction. The lever 33 then acts through its connecting link 32, steering arm 30, and latch 31 to pivot the arm 28 in a clockwise direction. The arm 28 then acts through the connecting bar 27 to pivot the arms 26 in a clockwise direction to turn the wheels 4 to the right. The left hand foot pedal is thus seen to operate to turn the front wheels 3 to the left and, at the same time, turn the rear wheels 4 to the right.

Also when the wheels 3 are steered by the foot pedals 34 the plow or cultivating gangs 39 will be shifted in the direction of the turn made by the wheels 3 so that the plowing or cultivating operation may be maintained in proper relation to rows of growing vegetation.

A shaft 46 is arranged transversely of the main frame 1 and is rotatably supported by the latter and also extends through the transmission housing and is rotatably supported thereby. Secured to the shaft 46 and operating in the transmission housing is a worm gear 47 meshing with a worm 48. The worm 48 is journaled in the transmission housing and is connected to said transmission by a clutch 49. The clutch is of a conventional construction and of a self-releasing type and the control shaft 50 thereof is connected to control grips 51 by a series of links and levers indicated by the character 52. The control grips 51 are carried by the brake control levers 19. Gears 53 are secured to the shaft 46 and journaled on said shaft adjacent the gears are raising and lowering levers 54 provided with dogs 55 to engage with the gears 53. The dogs 55 are controlled by hand grips 56 on the levers 54. Arms 57 are secured to the journaled ends of the levers 54 and are operatively connected to the plow or cultivating gangs, as shown at 57'. When turning the tractor sharply to the right or left by using power means and the brakes through the manipulation of the control levers 19, the operator also may bring about elevating of the cultivating or plow gangs 39 by power derived from the engine, this being accomplished by actuating the control grip 51 on the brake lever engaging the clutch 49 so that the shaft 46 will be rotated by the engine. The raising and lowering levers 54 being connected to the gears 53 of the shaft 46 will bring about elevation of the gangs 39. When desiring to lower the gangs the levers 54 are released from the gears 53 by actuating the dogs 55 through the hand grips 56. This also permits manual means for either raising or lowering the gangs and one independent of the other.

When the clutch 49 is actuated to interrupt the power from the engine to the shaft 46 the latter will be held against rotation due to the worm meshing with the worm gear 47, consequently maintaining the plow or cultivating gangs in an elevated position.

Located on the main frame 1 adjacent the various controls heretofore described is a seat 50' for the operator of the device.

A tractor constructed in accordance with the foregoing description and as shown in the official drawings is simple to control and the steering thereof is such that the tractor can be caused to turn within spaces of limited sizes or can be caused to readily follow rows of vegetation with a very little effort on the part of the operator due to the fact that the steering is power driven and manually controlled by the simple manipulation of foot pedals and hand controlled levers.

Having described the invention, I claim:

In a tractor, a frame, a pair of front wheels pivotally mounted on the frame, a pair of arms having their one ends connected to their respective front wheels to pivot same, a cross bar pivotally connected to the other ends of said arms, a pair of bell crank levers pivotally mounted on the frame, connecting links connecting the one ends of the bell crank levers to said cross bar, a pair of foot pedals pivotally mounted on the frame, a pair of push rods having their forward ends connected to their respective bell crank levers and their other ends connected to their respective foot pedals, a pair of rear wheels pivotally mounted on the frame, a pair of pivot arms engaging the rear wheels to pivot same, a cross bar pivotally connected to the rear wheel pivot arms, a pair of bell crank levers pivotally mounted on the rear end of the frame, connecting links connecting the one ends of the bell crank lever to the rear wheel cross bar, and pull rods having their one ends pivotally connected to their respective rear wheel bell crank levers and their other ends connected to their respective foot pedals.

FRED C. STANCIL.